Patented Nov. 4, 1941

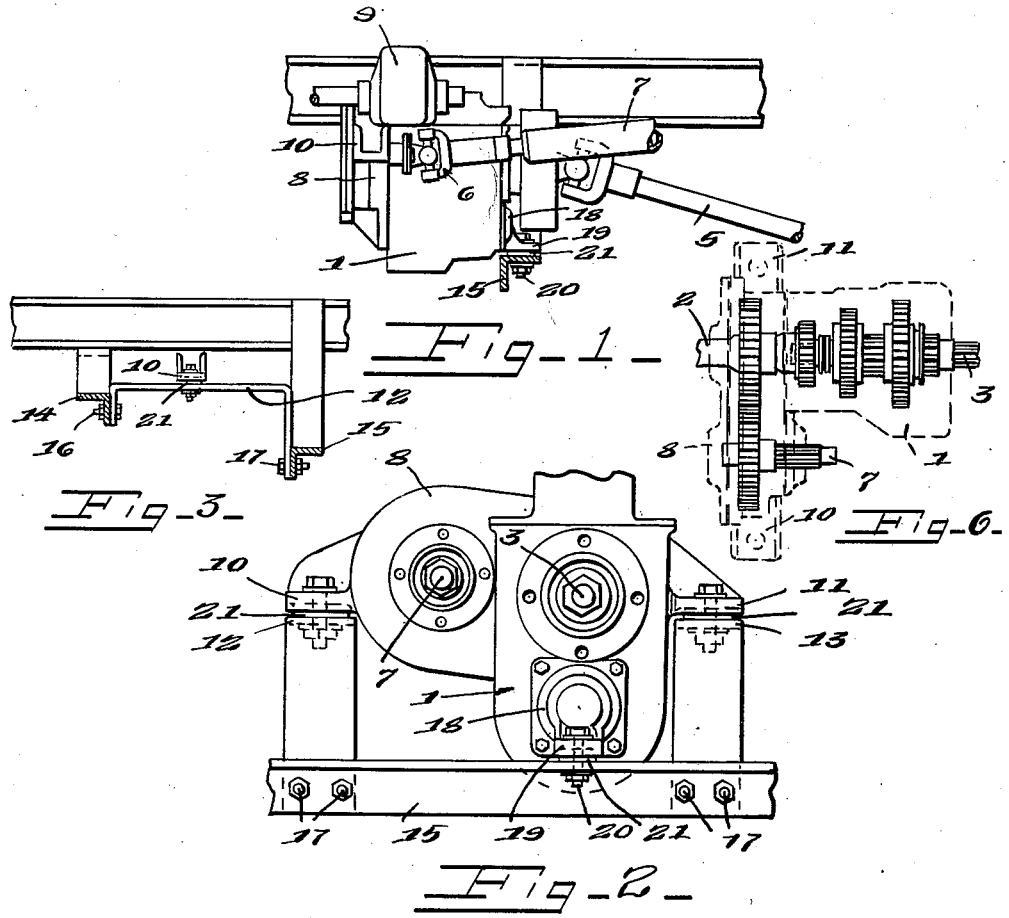
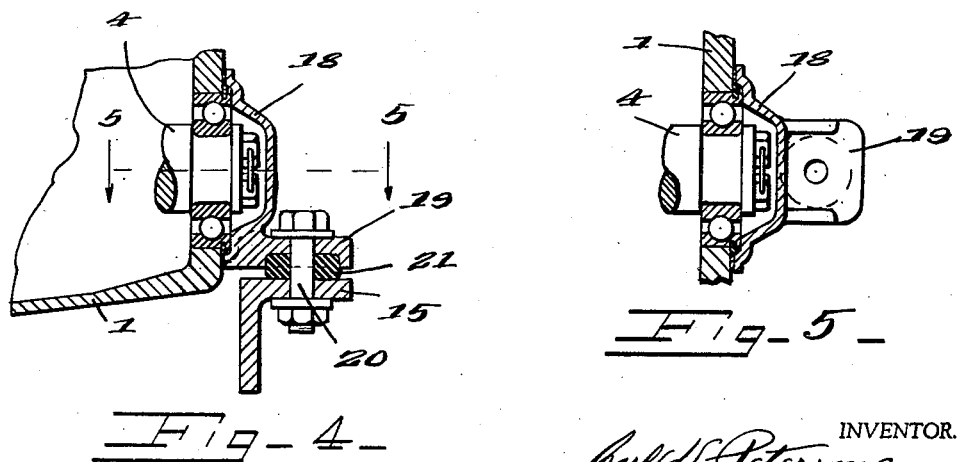

2,261,429

UNITED STATES PATENT OFFICE 2,261,429

TRANSMISSION GEAR BOX SUPPORT

Carl D. Peterson, Toledo, Ohio

Original application March 16, 1938, Serial No. 196,229. Divided and this application January 30, 1940, Serial No. 316,381

3 Claims. (Cl. 180—70)

This invention relates to supporting transmission gearings of motor vehicles, particularly where the gear box is remote from the power plant or engine and from the drive axle, or located amidship of the vehicle, and has for its object a three point mounting for the gear box, whereby the strains on the gear box, by reason of its being mounted remote from the drive axle and the engine plant are substantially balanced or distributed equally throughout the same.

The invention is here shown as embodied in a change speed transmission gearing constituting the subject matter of application Serial Number 196,229, filed March 16, 1938, of which this application is a division. The transmission gearing here shown is adapted for installations where the engine is located in the rear of the vehicle and the transmission gearing in front of the drive axle.

The invention consists in the novel features and in the combinations and constructions hereinafter set forth and claimed.

In describing this invention, reference is had to the accompanying drawing in which like characters designate corresponding parts in all the views.

Figure 1 is a side elevation of a transmission gearing and continguous parts including one of the side sills of the vehicle.

Figure 2 is an elevation, looking to the left in Figure 1, parts being omitted and the continguous parts of the chassis being shown.

Figure 3 is a detail view of the frame bars on which the front end of the gear box is mounted.

Figure 4 is a fragmentary sectional view through the rear bearing for the counter shaft and the bearing cap showing one of the three bearings of the three point mounting of the gear box.

Figure 5 is a sectional view on line 5—5, Figure 4.

Figure 6 is a plan view of the gearing illustrating the arrangement of the input and output shafts relative to the casing, the casing being indicated in broken line.

1 designates the gear box of a conventional change speed transmission gearing including an input shaft 2 journalled in the front wall of the gear box, an output shaft 3, a counter shaft 4, and change speed gearings therebetween, the input and output shafts being mounted in the gear box in axial alinement and the counter shaft below the horizontal plane of the axes of the input and output shafts. The output shaft is connected through a propeller shaft 5 and universal joints, as 6, to the driving axle, and the input shaft receives its power from the engine in the rear and from the drive shaft 7 and gearing located in a housing 8 unitary with the gear box mounted on the front wall of the gear box. The shaft 7 is connected to the engine in the rear of the vehicle.

9 designates a housing on the cover of the gear box which usually encloses a selecting and shifting finger operable from a remote control or lever located within reach of the driver.

The features thus far described form no part of this invention but constitute part of the subject matter of application Serial Number 196,229, before referred to.

The gear box 1 is mounted at three points, two of these points being at the front end of the gear box above the central horizontal plane of the gear box, and preferably in the plane in or near the plane of the axes of the input and output shafts, as seen in Figure 2, and the third point at the lower corner of the rear end of the gear box below the counter shaft.

As here shown, the gear box is provided with laterally extending lugs 10, 11 on opposite sides thereof and located at about the level of the axes of the input and output shafts, these lugs being mounted on and secured to longitudinally extending frame members 12, 13 which are supported by cross frame members, as the cross frame members or bars 14, 15, the frame members 12, 13 being secured at 16, 17 to the intermediate portion of the cross bars 14, 15.

In the illustrated embodiment of the invention, the rear or third mounting for the gear box is provided on the bearing cap 18 for the rear bearing of the counter shaft 4, see particularly Figures 4 and 5, the bearing cap being provided with a rearwardly extending shelf or lug 19 mounted on and secured to the intermediate portion of the cross bar 15, as by a bolt 20. Suitable cushions 21 are interposed between the lugs 10 and 11 and the frame bars 12, 13 and between the lug 19 and the cross bar 15. These three mounting points at 10, 11 and 19 are located in triangular formation, so that the gear box has a three point mounting, two of such points being at the front end or input shaft end of the gear box at about the level of the upper portion of the gear box, and preferably at the level of the axis of the input shaft, and the third point being below the axis of the counter shaft, the points of suspension being so located that the stresses on the gear box, due to its location remote from the engine and the drive axle, that is, amidship, are equally distributed throughout the gear box.

What I claim is:

1. The combination with a motor vehicle including a chassis; of a transmission mechanism including a gear box for a change speed gearing having input and output shafts extending through its front and rear ends respectively, and a counter shaft arranged below the former shafts, a bearing cap for the rear bearing of the counter shaft, the cap being provided with a rearwardly etxending lug secured to the chassis, and means for supporting the front end of the gear box on the chassis.

2. The combination with a motor vehicle including a chassis; of a transmission mechanism including a gear box for a change speed gearing having input and output shafts extending through its front and rear ends respectively, and a counter shaft arranged below the former shafts, a bearing cap for the rear bearing of the counter shaft, the cap being provided with a rearwardly extending lug secured to the chassis, the gear box being mounted on the chassis at opposite sides of the upper portion of the front end of the gear box, whereby the gear box is mounted on the chassis at three points arranged in triangular formation.

3. The combination with the chassis of a motor vehicle, of a transmission mechanism including a gear box for change-speed gearing having input and output shafts extending through its opposite ends respectively and a counter shaft mounted in the gear box below the former shafts and also an auxiliary gear casing mounted on and rigid with the front input shaft end of the gear box, and a drive shaft extending laterally to one side of the gear box and mounted on the laterally extending portion of the auxiliary gear box and connected to the input shaft through the gears in the auxiliary casing, the drive shaft being located outside of the gear box and extending in the same general direction as the output shaft, and means by which the gear box is supported at two points on opposite sides thereof at substantially the level of the input shaft and the drive shaft, one of said points being at the outer end of the laterally extending portion of the auxiliary casing, and at a third point near the bottom of the gear box at the output end thereof below the counter shaft.

CARL D. PETERSON.